United States Patent [19]

Allen et al.

[11] 3,820,417
[45] June 28, 1974

[54] CONTROLS FOR SEQUENTIALLY ENGAGING TRANSMISSION, TORQUE CONVERTOR LOCK-UP AND MASTER CLUTCHES

[75] Inventors: Thomas E. Allen, Mustang, Okla.; Shairyl I. Pearce, East Peoria, Ill.

[73] Assignee: Caterpillar Tractor Co., Peoria, Ill.

[22] Filed: Aug. 10, 1972

[21] Appl. No.: 279,686

[52] U.S. Cl. ............... 74/733, 192/3.26, 192/3.3, 192/3.33, 192/3.57, 192/87.13, 192/109 F, 137/628
[51] Int. Cl. .................... F16d 39/00, F16h 45/02
[58] Field of Search ....... 192/3.57, 3.58, 3.33, 3.26, 192/109 F; 74/733, 732

[56] References Cited
UNITED STATES PATENTS

| | | | |
|---|---|---|---|
| 3,326,066 | 6/1967 | Murphy | 192/3.33 X |
| 3,352,392 | 11/1967 | Black et al. | 192/3.57 |
| 3,532,200 | 10/1970 | Chana | 192/109 F |
| 3,583,422 | 6/1971 | Dach | 192/109 F |
| 3,680,398 | 8/1972 | Schneider et al. | 192/3.33 |

Primary Examiner—Benjamin W. Wyche
Attorney, Agent, or Firm—Phillips, Moore, Weissenberger, Lempio & Strabala

[57] ABSTRACT

A clutch control system for a drive train having an input clutch arranged between a prime mover and the impeller element of the torque converter, hydraulically operable transmission means being coupled with the turbine element of the torque converter, the clutch control system including an input clutch control valve associated with the transmission means for causing engagement of the input clutch subsequent to substantial engagement of the transmission means, the input clutch control valve having a delayed response to fluid pressure from the transmission means to insure engagement of the input clutch subsequent to the transmission means and an accumulator for controlling the rate of pressure rise in the input clutch. One embodiment of the invention also includes a lock-up clutch for selectively engaging the prime mover with the turbine element and the transmission means, a lock-up clutch control valve being included in the clutch control system for sequencing operation of the lock-up clutch relative to the input clutch.

22 Claims, 6 Drawing Figures

CONTROLS FOR SEQUENTIALLY ENGAGING TRANSMISSION, TORQUE CONVERTOR LOCK-UP AND MASTER CLUTCHES

BACKGROUND OF THE INVENTION

The present invention relates to drive trains of the type having a torque converter arranged between a prime mover and a transmission, an input clutch being arranged between the prine mover and torque converter for operation by an input clutch control valve. Drive trains of this type are commonly employed in heavy duty vehicles such as earthmoving machines having high horsepower requirements. A major problem in developing a power shift transmission or drive train for such machines is to provide an efficient and effective means for adequently absorbing transient energy peaks developed in the drive train. In very large vehicles, this problem is even more acute because of the very large rotating inertias present in the drive train.

One approach for overcoming this problem has been the design of drive trains with a master clutch adapted to effectively absorb the energy peaks. In such an arrangement, one clutch or group of clutches may be designed for initial engagmenet with the master clutch being the last clutch to be engaged. Thus, the master clutch always picks up the load and absorbs the primary energy of a transient shift. In a drive train of the type referred to above, this system is of particular advantage since the multiple clutches of a conventional transmission may be designed for initial engagement with the single input clutch serving as a master clutch. Further, the fluid coupling in the torque converter also assists in absorbing shock so that the load on the input clutch is somewhat reduced.

In addition to the proper sequencing of clutch engagement as discussed above, it is also necessary to closely regulate the rate at which the various clutches are engaged. In various prior art designs, relatively complicated valve arrangements have been employed with certain valves serving to establish the sequence of clutch engagement while other valves serve to regulate pressure and thus control the rate of engagement for the clutch or clutches.

SUMMARY OF THE PRESENT INVENTION

To overcome one or more of the problems referred to above, the present invention provides a clutch control system in a drive train having an input clutch arranged between a prime mover and a torque converter with a transmission means being arranged on the output side of the torque converter, the clutch control assembly including an input clutch control valve with means having a delayed response to engagement of the transmission means for actuating the input clutch after substantial engagement of the transmission means and accumulator means for controlling the rate of pressurization in the input clutch.

In another embodiment of the invention, a lock-up clutch is provided for selectively coupling the prime mover with the turbine element of the torque converter and the transmission means, a lock-up clutch control valve being arranged to cause engagement of the lock-up clutch only when the input clutch is engaged and under selected operating conditions in the drive train.

The clutch control system referred to above for the input clutch only is a mechanically simple and effective means for both assuring the proper sequence of engagement for the input clutch relative to the transmission means as well as closely establishing the rate of engagement for the input clutch. For example, where modulated operation of the input clutch is desired, the rate of engagement for the input clutch is determined by accumulator means associated with the input clutch control valve as well as a restrictive orifice communicating the input clutch control valve with both the input clutch and the accumulator means. This arrangement has been found to be particularly simple and effective since modulation by means of the accumulator and associated restrictive orifice insures positive control over the rate of pressurization for the input clutch without the use of a regulating valve as such.

Use of the clutch control system to regulate operation of both the input clutch and a lock-up clutch of the type referred to above further improves operation of the drive train while still allowing the input clutch to act as a master clutch in combination with the torque converter.

Other ojects and advantages of the present invention are made apparent in the following description having reference to the accompanying drawings.

OUTLINE OF THE DRAWINGS

DETAILED DESCRIPTION

Figure 4:
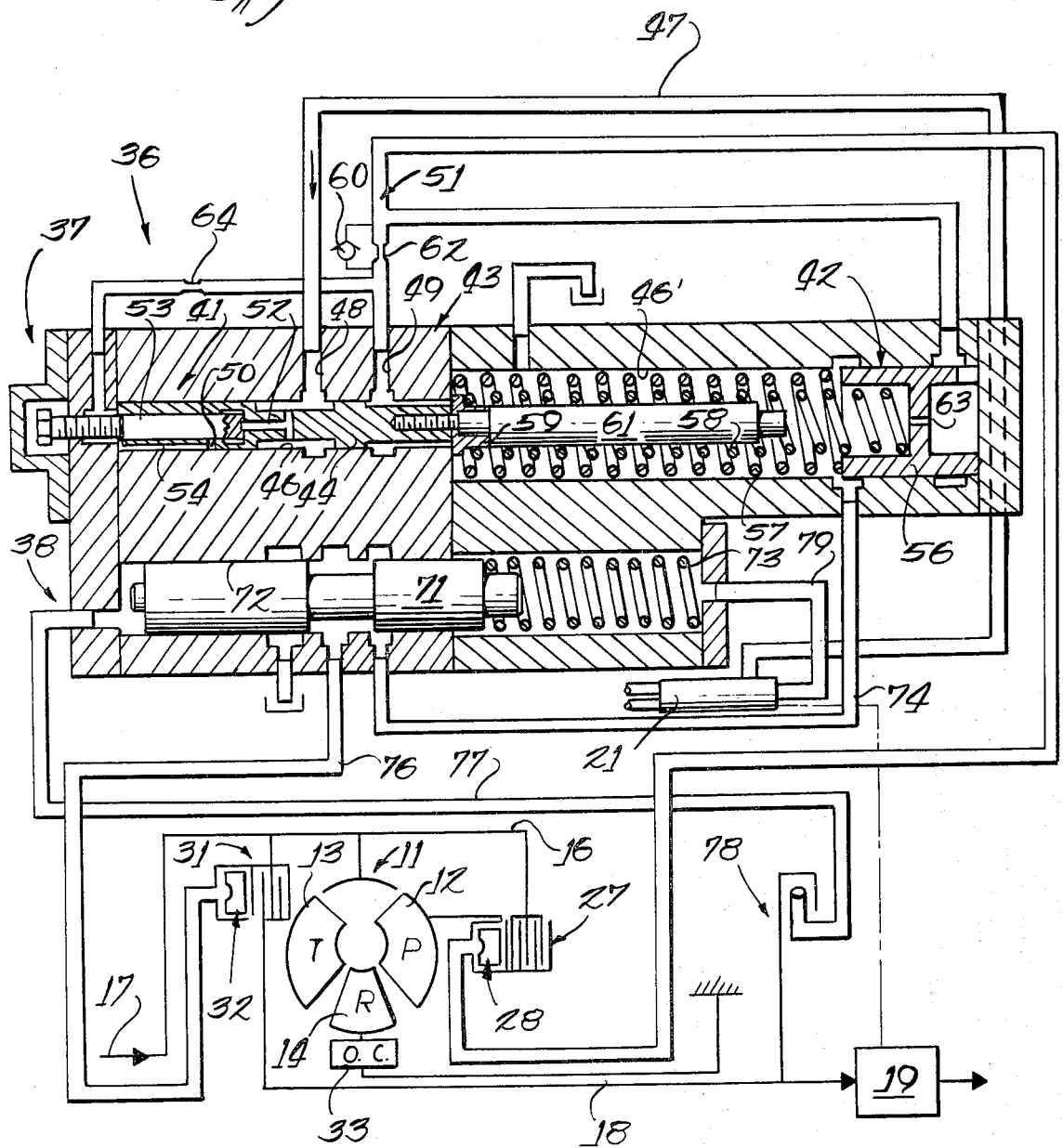
FIG. 4 is a partially schematic and partially sectioned view of a clutch control valve arrangement for regulating operation of both an input clutch and a lock-up clutch.

A drive train of the type contemplated by the present invention is schematically shown in FIG. 4 together with a valve assembly for controlling one or more clutches in the drive train. Portions of the drive train are also illustrated in somewhat greater detail in FIGS. 1 and 2. Referring to those figures and in particular to FIG. 4, the drive train includes a torque converter 11 having an impeller element 12, a turbine element 13 and a reaction or stator element 14. The torque converter is preferably of the type having a rotating housing 16 coupled for rotation with a prime mover or engine schematically indicated in FIG. 4 at 17. An output shaft 18 for the torque converter coupled the turbine element 13 with a transmission means 19 which is hydraulically operated by a transmission control valve assembly 21.

The transmission means 19 is of a generally conventional type providing both speed and directional control for a vehicle. As illustrated in greater detail in FIG. 2, the transmission means provides 6 forward and 2 reverse speeds. A "splitter" planetary gear set 22 provides for over drive and direct drive operation with engagmeent of clutch No. 1 and clutch No. 2. Three additional planetary gear sets 23, 24 and 26 provide high, intermediate, low and reverse ratios in conjunction with selective engagement of clutches No. 3–6 respectively. For purposes of the present invention, it is sufficient to note that the various clutches within the transmission means 19 are hydraulically engaged by the transmission control valve 21.

Figure 1:
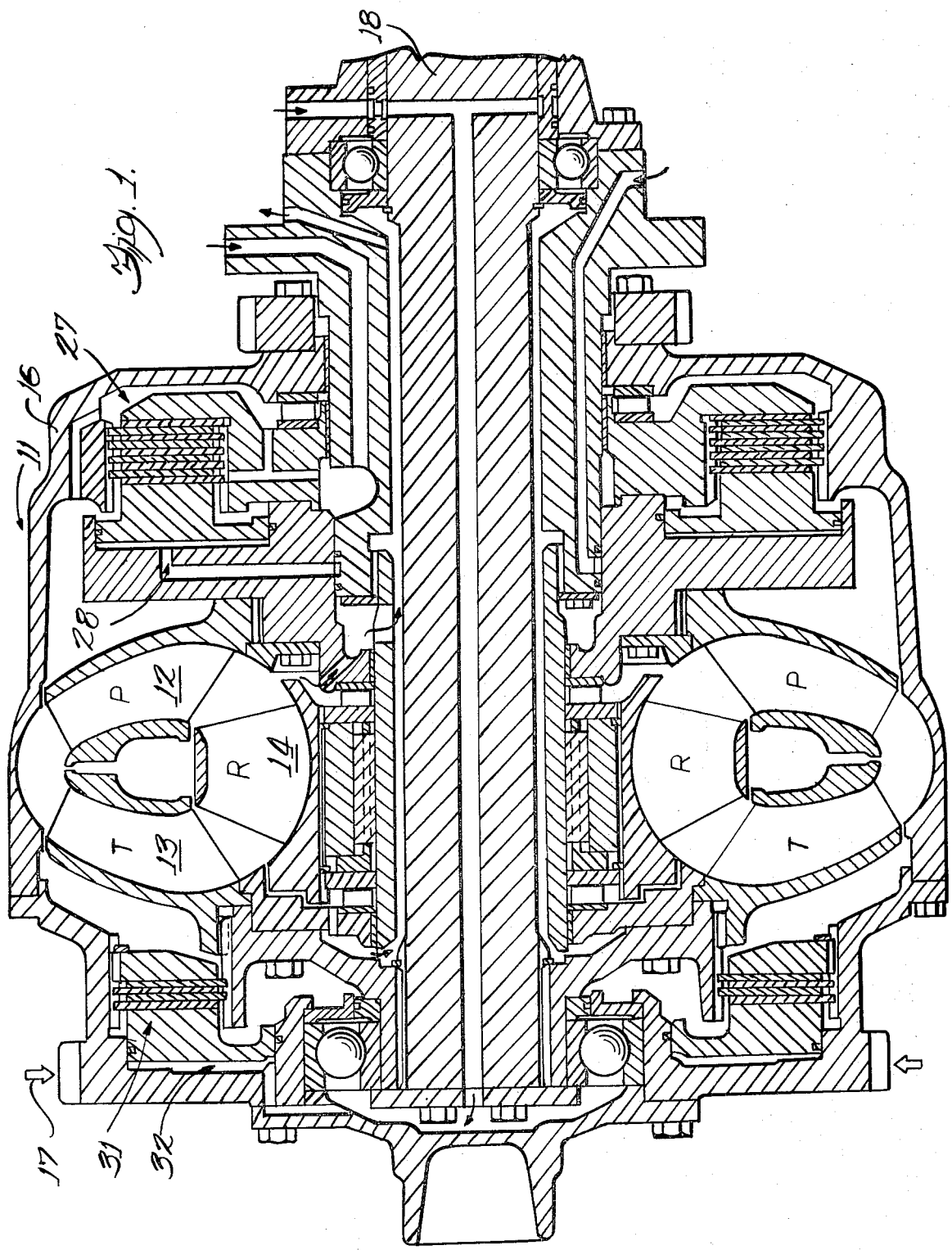
FIG. 1 is a longitudinally sectioned view of a torque converter and associated clutch of the type contemplated by the present invention.
Figure 2:
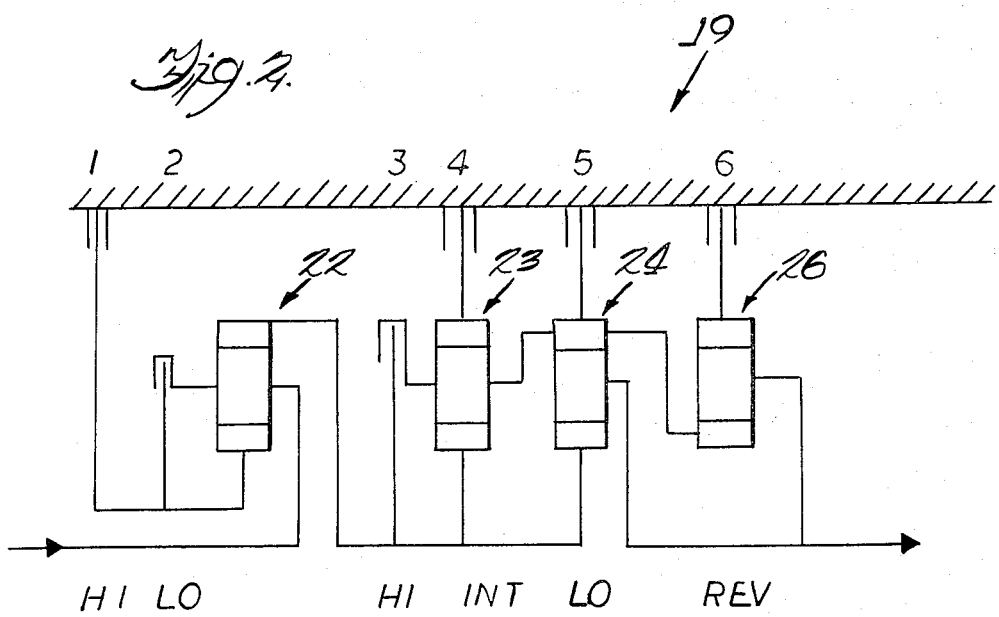
FIG. 2 is a schematic representation of a transmission portion of the drive train downstream from the torque converter.

To provide proper engagement of the prime mover through the torque converter and transmission means of the drive train during operation, a plurality of clutches is provided as may be best seen in FIGS. 4 and 1. Initially, an input clutch 27 is engaged by fluid pressure in an actuating chamber 28 for coupling the impeller element 12 with the rotating housing 16 and accordingly with the prime mover 17. A lock-up clutch 31 is engaged by hydraulic pressure in an actuating chamber 32 for selectively coupling the rotating housing 16 and accordingly the prime mover 17 with the turbine element 13 and the output shaft 18. The lock-up clutch upon engagement effectively bypasses the fluid coupling of the torque converter and couples the prime mover directly with the transmission means 19. A conventional overrunning clutch 33 is also provided to conventionally control rotation of the stator element 14 in the torque converter to provide increased converter efficiency and minimize converter losses during lock-up clutch engagement. For example, when the overrunning clutch is engaged, the stator element 14 is locked against rotation. The overrunning clutch permits free rotation of the stator element in one direction.

As noted above, the present invention contemplates a clutch control assembly for regulating operation of the input clutch 27 either alone or in combination with the lock-up clutch 31.

The basic purpose of the clutch control assembly is to insure that the input clutch 27 is the last element of the drive train to be engaged during start up, or during a gear shift in the transmission means 19, to absorb transient energy peaks within the drive train together with the torque converter. Accordingly, the input clutch 27 is disengaged during each shift and again reengaged after selected clutches in the transmission means 19 are engaged. This allows more rapid pressurization of the transmission clutches since they are no longer required to absorb the full load of a shift. This in turn tends to reduce design requirements for the transmission means and its control system. For example, the relatively large number of clutches with the transmission means may possibly be of somewhat lighter construction, thus simplifing the transmission means, or else may provide for greater reliability of operation in the drive train.

The lock-up clutch and overrunning clutch tend to provide for greater operational efficiency within the drive train by adjusting the fluid coupling which the torque converter represents within the drive train. Engagement of these two clutches depends on the output/input speed ratio for the torque converter and accordingly upon the operating speed for the output shaft 18. At relatively high input and output speeds, the lock-up clutch 31 commences engagement to provide a direct drive across the torque converter for higher operational efficiency. The overrunning clutch 33 commences freewheeling at approximately the same time, for example, when the output shaft 18 is rotating at approximately 85 percent of the rotating speed for the torque converter input or housing 16, to improve overall operating efficiency of the torque converter. The lock-up clutch commences engagement at approximately the same general high speed ratio for the torque converter with the overrunning clutch being placed in a free wheeling condition before the lock-up clutch is completely engaged.

In addition to regulating the engagement sequence for the various clutches as discussed above, it is also necessary to closely regulate the rate of engagement for the clutches, particularly the input clutch which is designed to absorb shock within the drive train. As is well known in the art, engagement of the input clutch either too rapidly or too slowly may tend to result in rough operation of the vehicle and may even result in damage to various components of the drive train. The clutch control assembly of the present invention is designed to closely regulate the rate of engagement for the input clutch with a relatively simple and thus reliable valve assembly.

The clutch control assembly of the present invention is generally indicated in FIG. 4 at 36. An upper portion 37 of the clutch control assembly regulates operation of the input clutch 27 while a lower portion 38 regulates engagement of the lock-up clutch 31. As described in greater detail below, the input clutch control valve 37 includes delay means 41 for insuring engagement of the input clutch 27 subsequent to engagement of the transmission means 19 and accumulator means 42 for closely regulating the rate of pressurization within the input clutch 27.

The input clutch control valve and the lock-up clutch control valve are both arranged within a common two-piece housing 43. The input clutch control valve 37 includes a spool 44 slidably arranged within a bore 46. Fluid under pressure is communicated to the input clutch control valve 37 from the transmission control valve assembly 21 through a conduit 47 and a passage 48 in the valve housing 43. An outlet passage 49 and a branched conduit 51 communicate the input clutch control valve 37 with the actuating chamber 28 of the input clutch, the accumulator means 42 and one end of the valve bore 46 for reasons discussed in greater detail below. Increasing fluid pressure in the conduit 47, indicative of generally complete engagement of selected transmission clutches by the transmission control valve 21, is communicated through an internal passage 52 in the spool 44 to act against a slug 53 which is slidably arranged in one end of the spool 44. A passage 54 formed by the spool 44 communicates the internal passage 52 with the left end of the bore 46 after the spool 44 is shifted somewhat to the right by fluid pressure acting upon the slug 53 opening hole 50 providing a snap action before oil is routed to outlet passage 49. These elements in combination comprise the delay means referred to above to insure that fluid pressure is not communicated to the input clutch 27 through the branched conduit 51 until the transmission means 19 is substantially engaged.

Figure 3:
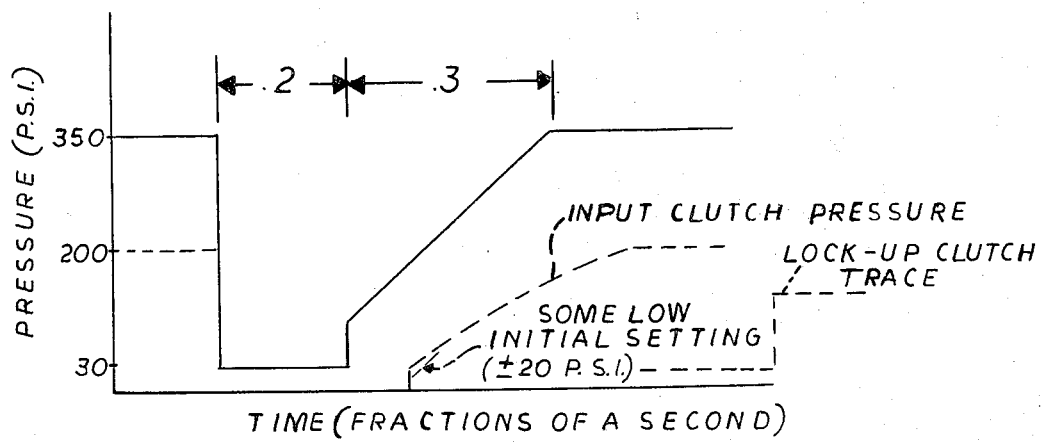
FIG. 3 is a graphical representation of various pressure traces developed during operation of the present invention.

The accumulator means 42 is generally arranged within an enlarged bore 46' of the bore 46. A load piston 56 is urged toward the right within the enlarged bore 46' by an outer spring 57. An inner spring 58 is also arranged for interaction between the load piston 56 and a retaining plate 59 which is threaded into engagement with the spool 44 together with an elongated member 61 extending into the enlarged bore 46'. Fluid pressure communicated into the branched conduit 51 towards the input clutch 27 also acts upon the load piston 56 urging it leftwardly against the springs 57 and 58 to regulate the rate of pressurization within the input clutch. Referring momentarily to FIG. 3, pressurization in the conduit 47 is illustrated by the solid line pressure trace during a shift of the transmission means. The pressure in the input clutch as well as the pressure acting upon the load piston 56 in the right end of the enlarged bore 46' is illustrated by a broken line. Another suitably identified broken line in FIG. 3 also represents pressurization of the lock-up clutch in a manner which is described in greater detail below. It is also noted that the spring 58 and/or member 61 provides a resilient or lost motion connection between the load piston 56 and the spool 44 which also conditions the spool 44 to meter fluid into the branched conduit 51 as described in greater detail below.

Modulated engagement or disengagement of the input clutch is provided by the elements described above in combination with a restrictive orifice 62 which provides fluid communication to both the input clutch and accumulator means as well as a leakage orifice 63 formed in the load piston 56. Another orifice 64 in the branched conduit 51 acts as a damper for the spool 44 to allow oil to enter chamber at the left end to permit spool 44 to move without vacuum. A reverse check valve 60 provides a by-pass around orifice 62 to permit quick dump of the accumulator means 42 when rail pressure in conduit 47 drops for a transmission shift. This immediately conditions the input clutch for a preselected shift cycle herein described.

To regulate opertion of the lock-up clutch 31, the lock-up clutch control valve 38 includes a spool 71 slidably arranged within a bore 72 and biased in a leftward direction by a spring 73. A conduit 74 communicates the bore 72 with the enlarged bore 46' of the input clutch control valve. The load piston 56 normally blocks fluid communication between the conduit 74 and the branched conduit 51. However, as the load piston is shifted leftwardly by rising fluid pressure in the conduit 51, that fluid pressure is also communicated to the conduit 74 and thus to the lock-up clutch control valve after substantial pressurization of the input clutch 27. Another conduit 76 communicates the bore 72 with the actuating chamber 32 of the lock-up clutch. The spool 71 is normally positioned by the spring 73 to block communication between the conduit 74 and 76 and prevent engagement of the lock-up clutch. However, the spool 71 is also subject to fluid pressure communicated into the left end of the bore 72 through a conduit 77 from a speed sensing means indicated at 78. The speed sensing means 78 may be either a pitot tube as illustrated or a centrifugal valve, for example, suitable for communicating pressure towards the lock-up clutch spool through the conduit 77 when the output shaft 18 is rotating above a minimum speed of operation. Above that minimum speed, fluid pressure acting on the left end of the spool 71 shifts it rightwardly to permit fluid communication between the conduit 74 and 76 for engagement of the lock-up clutch 31.

For low speed range settings of the transmission means 19, it is generally more desirable to constantly maintain the fluid coupling of the torque converter rather than to attempt providing more efficient operation through engagement of the lock-up clutch. Accordingly, the right end of the lock-up clutch valve bore 72 is in communication with the transmission control valve assembly 21 by another conduit 79. During low speed range settings of the transmission, either in forward or reverse, fluid pressure is communicated through the conduit 79 to prevent shifting of the spool 71 so that, under these conditions, fluid communication between the conduit 74 and 76 is prevented.

Figure 5:
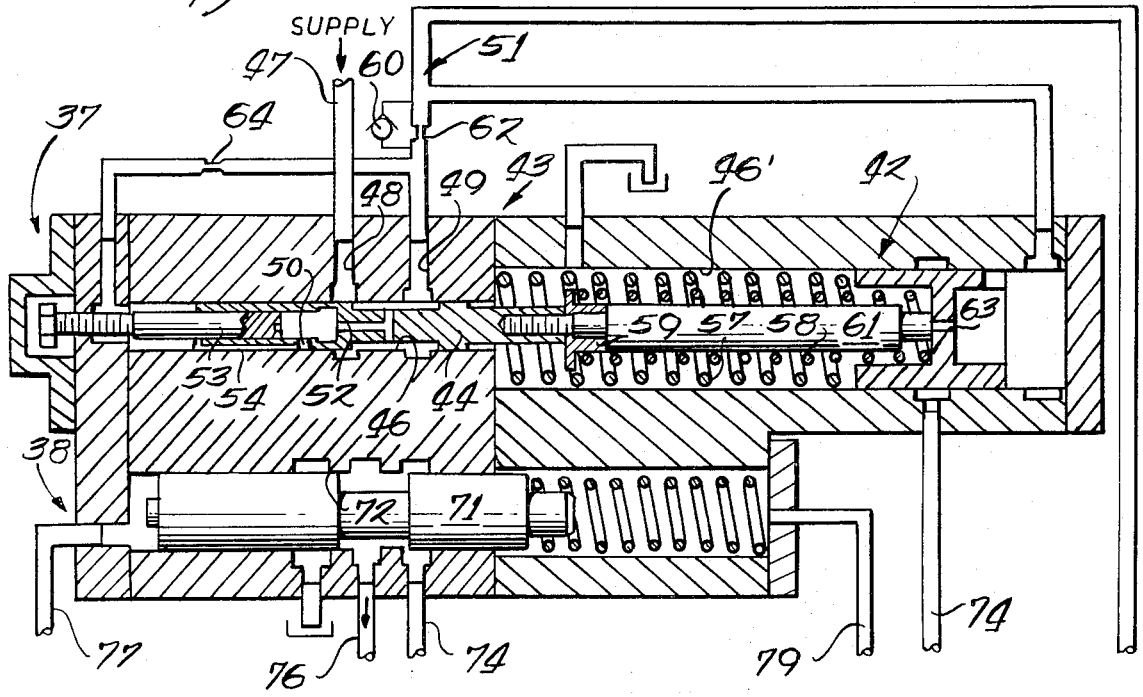
FIG. 5 is a view similar to FIG. 4 with the valve being shown in a condition subsequent to engagement of the input clutch.
Figure 6:
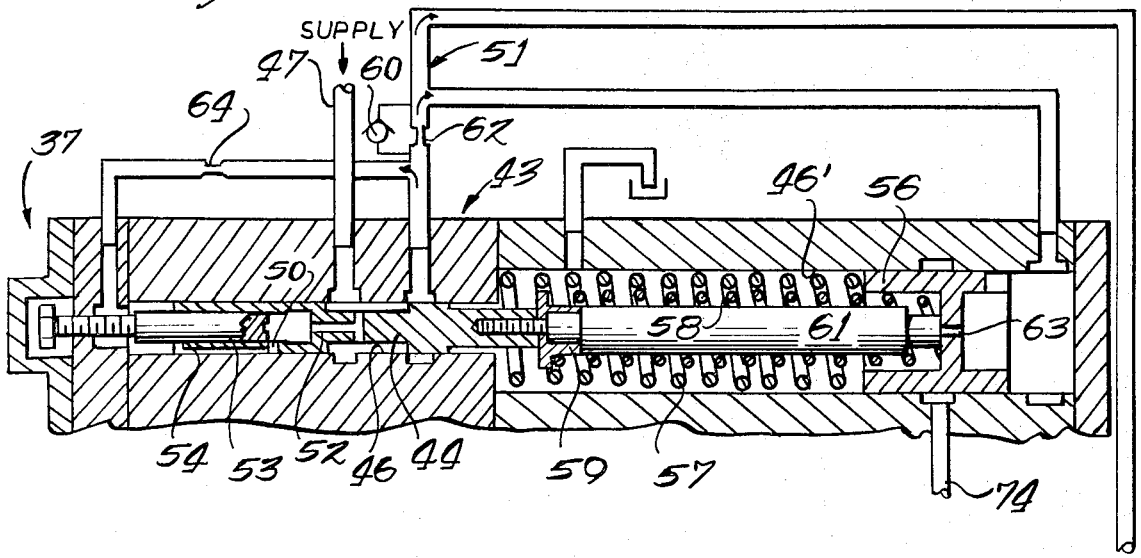
FIG. 6 is a view similar to FIG. 4 but with the clutch control system including only an input clutch control valve having suitable delay means and accumulator means for regulating operation of an input clutch associated with a torque converter.

Other operating positions of the input clutch control valves are also shown in FIGS. 5–6. Further, the input clutch control valve is illustrated by itself in FIG. 6 to represent another embodiment of the present invention which need not include the lock-up clutch control valve 38. Such an embodiment of the invention would be suitable where the input clutch 27 were employed without the lock-up clutch 31.

OPERATION OF THE EMBODIMENT OF FIGS. 4–6

As noted above, the input clutch control valve 37 assures engagement of the input clutch subsequent to the engagement of the transmission means 19 becuase of fluid pressurization of the conduit 47 by the transmission control valve 21, along with the delay means generally indicated at 41. The rate of pressurization or modulation for the input clutch 27 is regulated by the accumulator means 42 either along or in combination with the restricted orifice 62. The load piston 56 also serves to subsequently condition the spool 44 for metering fluid into the branch conduit 51 because of the resilient coupling provided by the spring 58 between the load piston 56 and the spool extension 61. The spring 58 raises the regulated pressure of the valve at outlet passage 49 to stay ahead of the accumulator needs and allow the use of a larger orifice 62 to permit lower differential pressure during modulation. The lock-up clutch control valve 38 provides for engagement of the lock-up clutch only after the input clutch is substantially engaged and then only during selected operating conditions determined by the rotating speed of the output shaft 18 and the setting of the transmission means 19 by the control valve 21. A more detailed description of operation is set forth below.

During start-up conditions, selected clutches in the transmission means are filled by the control valve 21 with fluid pressure subsequently rising in the conduit 47. This rising fluid pressure is communicated through the passage 52 to interact between the slug 53 and the spool 44. As the spool 44 is shifted rightwardly, orifice 50 opens pressure chamber 47 to passage 54 to communicate the fluid pressure into the left end of the spool bore 46. The spool 44 is then shifted rightwardly by a snap action into the position shown by FIG. 5 to provide substantially free fluid communication between the conduits 47 and 51. The combination features described immediately above insure that the transmission means 19 is fully engaged before the input clutch 27. Fluid pressure communicated into the branched conduit 51 crosses the restrictive orifice 62 and simultaneously enters the input clutch actuating chamber 28 and the right end of the enlarged spool bore 46'. As fluid pressure in the branch conduit increases, the load piston 56 is shifted leftwardly and interacts with the spool 44 against springs 57 and 58 to modulatably pressurize the input clutch.

The load piston 56 is shifted toward the left and the spool 44 moves toward the right to regulate inlet passage 48 as shown in FIG. 5 until the load piston 56 comes into solid engagement with the extension 61. At that point the spring 58 no longer serves any function and the balancing pressures on the spool 44 and load piston 56 position the spool 44 as shown in FIG. 6 to meter fluid into the passage 49 and the branch conduit 51 at a selected maximum pressure level for the input clutch, for example 200 p.s.i., after the load piston has continued to modulate from position in FIG. 5 to that in FIG. 6.

It is particularly to be noted that the input clutch control valve thus performs the function of a conventional pressure modulating reducing valve. However, it is used as an accumulator type modulating valve in accordance with the above description with the input clutch control valve spool 44 subsequently being conditioned by the accumulator means to meter fluid to the input clutch generally in the same manner as a reducing valve at a value less than the inlet passage 48 as a function of outer spring 57.

As noted above, fluid is communicated into the conduit 74 when the load piston 56 is shifted sufficiently to the left. Thus, the lock-up clutch can only be engaged subsequent to substantial engagement of the input clutch 27. Assuming that the transmission control valve assembly 21 is conditioned for other than a low speed ratio setting, operation of both the lock-up clutch 31 and the overrunning clutch 33 is dependent upon the operating speed of the output shaft 18 in a generally conventional manner.

When the transmission is shifted by the transmission control valve assembly 21 during operation, fluid pressure in the valve assembly 21 immediately drops to reflect filling of new clutches within the transmission means 19. That pressure drop is also reflected in the conduit 47 so that the input clutch control valve spool 44 and the load piston 56 are again returned by the springs 57 and 58 to the positions shown in FIG. 4. It may be noted that during this reaction, fluid communication to the lock-up clutch control valve 38 is also blocked by the load piston 56.

As the transmission clutches are again filled, pressure once more rises in the conduit 47 and the spool 44 is again shifted to the right by fluid from the conduit 47 acting upon the delay means 41. The input clutch 27 is again pressurized in the same manner described above. Fluid is also communicated again to the lock-up clutch valve 38 through the conduits 74 with operation of the lock-up clutch and overrunning clutch 33 again being dependent primarily upon the operating speeds for the output shaft 18.

What we claim is:

1. In a drive train having a prime mover, a torque converter including an impeller element, a turbine element and a stator element, transmission means coupled with the turbine element, an input clutch hydraulically operable for coupling the prime mover with the impeller element and a lock-up clutch which is hydraulically operable for coupling the prime mover with the turbine element and with the transmission means, a control system for the input clutch and lock-up clutch comprising:

an input clutch control valve for regulating the flow of actuating fluid to the input clutch, the input clutch control valve being associated with the transmission means for causing engagement of the input clutch subsequent to substantial engagement of the transmission means, A lock-up clutch control valve for regulating the flow of actuating fluid to the lock-up clutch, the input clutch control valve comprising means for communicating actuating fluid to the lock-up clutch control valve subsequent to substantial engagement of the input clutch, and speed responsive means for sensing operating speed of an element in the drive train on the output side of the torque converter, the lock-up clutch control valve being responsively coupled to the speed responsive means for communicating fluid from the inlet clutch control valve to the lock-up clutch above a minimum operating speed of the element in the drive train.

2. The control system of claim 1 wherein the lock-up clutch control valve is also responsively associated with the transmission means for preventing engagement of the lock-up clutch when the transmission means is conditioned for low speed ratio operation.

3. The control system of claim 1 wherein the input clutch control valve comprises means having a delayed response to engagement of the transmission means for causing the input clutch control valve to communicate actuating fluid to the input clutch after substantial engagement of the transmission means.

4. The control system of claim 3 wherein the lock-up clutch control valve is also responsively associated with the transmission means for preventing engagement of the lock-up clutch when the transmission means is conditioned for low speed ratio operation.

5. The control system of claim 1 further comprising accumulator means effectively communicated with the input clutch control valve for controlling the rate of pressurization in the input clutch.

6. The control system of claim 5 wherein the input clutch control valve comprises means having a delayed response to engagement of the transmission means for causing the input clutch control valve to communicate actuating fluid to the input clutch after substantial engagement of the transmission means.

7. The control system of claim 5 further comprising a resilient coupling between the input clutch control valve and the accumulator means.

8. The control system of claim 7 further comprising a restrictive orifice communicating an outlet passage of the input clutch control valve with the input clutch and the accumulator means.

9. The control system of claim 8 wherein the accumulator means includes means for communicating actuating fluid to the lock-up clutch control valve subsequent to substantial engagement of the input clutch.

10. In a drive train having a prime mover, torque converter means, a hydraulically operable input clutch arranged between the prime mover and torque converter means and transmission means including a hydraulically operable clutch means arranged on an output side of the torque converter means, the clutch means being responsive to a transmission control valve means, a control valve for the input clutch comprising
- an input clutch control valve means in fluid communication between the transmission control valve means and the input clutch,
- means having a delayed response to fluid pressure from the transmission control valve means for causing the input clutch control valve means to communicate actuating fluid to the input clutch after substantial hydraulic pressurization of the clutch means in the transmission means by the transmission control valve means,
- accumulator means effectively communicated with the input clutch control valve means for controlling the rate of pressure rise in the input clutch, and
- a hydraulically operable lock-up clutch for coupling the prime mover with the transmission means and a lock-up clutch control valve, the accumulator means including means for communicating actuating fluid to the lock-up clutch subsequent to substantial engagement of the input clutch.

11. The control valve of claim 10 further comprising a resilient lost-motion coupling between the input clutch control valve means and the accumulator means.

12. The control valve of claim 11 further comprising a restrictive orifice communicating an outlet passage of the input clutch control valve means with the input clutch and the accumulator means.

13. In a drive train having a prime mover, torque converter means, a hydraulically operable input clutch arranged between the prime mover and torque converter means and transmission means including hydraulically operable clutch means arranged on an output side of the torque converter means, the clutch means being responsive to a transmission control valve means, a control valve assembly comprising
- a valve body defining an elongated bore with passages respectively communicating the bore to the transmission control valve means and the input clutch,
- a valve spool arranged in the bore for regulating fluid communication thereacross,
- accumulator means in communication with the passage between the valve body bore and input clutch and being resiliently coupled with the valve spool to control the rate of pressure rise in the input clutch and to provide delayed conditioning of the valve spool for metering fluid under pressure to the input clutch, and
- a hydraulically actuated lock-up clutch for selectively coupling the prime mover with the transmission means and a lock-up clutch control valve for regulating the flow of actuating fluid to the lock-up clutch, the input clutch control valve comprising means for communicating actuating fluid to the lock-up clutch control valve subsequent to substantial engagement of the input clutch.

14. The control valve assembly of claim 13 further comprising a restrictive orifice in the passage communicating the elongated bore with the input clutch and the accumulator means.

15. The control valve assembly of claim 14 wherein the accumulator means includes means for communicating actuating fluid to the lock-up clutch control valve subsequent to substantial engagement of the input clutch.

16. In a drive train having a prime mover, torque converter means, a hydraulically operable input clutch arranged between the prime mover and torque converter means and transmission means including hydraulically operable clutch means arranged on an output side of the torque converter means, the clutch means being responsive to a transmission control valve means, a control valve assembly comprising
- a valve body defining an elongated bore with passages respectively communicating the bore to the transmission control valve means and the input clutch,
- a valve spool arranged in the bore for regulating fluid communication thereacross,
- accumulator means in communication with the passage between the valve body bore and input clutch and being resiliently coupled with the valve spool to control the rate of pressure rise in the input clutch and to provide delayed conditioning of the valve spool for metering fluid under pressure to the input clutch, and
- means having a delayed response to fluid pressure from the transmission control valve means for causing the valve spool to communicate actuating fluid to the input clutch after substantial hydraulic pressurization of the clutch means in the transmission means, the means having a delayed response comprising an axial bore formed in one end of the valve spool for receiving a reaction piston means and means for selectively directing fluid from the transmission control valve means for interaction with the reaction piston means and the full cross-sectional area of the one end of the valve spool.

17. The control valve assembly of claim 16 further comprising a hydraulically operable lock-up clutch arranged between the prime mover and the transmission means, a lock-up clutch control valve also being responsively associated with the transmission control valve means for preventing engagement of the lock-up clutch when the transmission means is conditioned for low speed ratio operation.

18. In a drive train having a prime mover, torque converter means, a hydraulically operable input clutch arranged between the prime mover and torque converter means and transmission means including hydraulically operable clutch means arranged on an output side of the torque converter means, the clutch means being regulated by a transmission control valve means, a control valve for the input clutch comprising
- an input clutch control valve means in communication with the transmission control valve means and the input clutch, the input clutch control valve means including means responsive to substantial engagement of the clutch means by the transmission control valve means for communicating actuating fluid to the input clutch, and
- accumulator means in communication with the input clutch and coupled by means of a resilient connection with the input clutch control valve means, the accumulator means being urged into effective abutting engagement with the input clutch control valve means by fluid communicated from the input clutch control valve means to the input clutch.

19. The control valve of claim 18 wherein the input clutch control valve means includes means having a delayed response to fluid pressure from the transmission control valve means for causing the input clutch control valve means to communicate actuating fluid to the input clutch after substantial hydraulic pressurization of the clutch means in the transmission means.

20. The control valve of claim 18 further comprising a restrictive orifice communicating an outlet passage from the input clutch control valve means with the input clutch and the accumulator means.

21. The control valve of claim 19 further comprising a hydraulically operable lock-up clutch means for coupling the prime mover with the transmission means, a lock-up clutch control valve regulating the flow of actuating fluid to the lock-up clutch.

22. The control valve of claim 21 wherein the accumulator means includes means for communicating actuating fluid to the lock-up clutch control valve subsequent to substantial engagement of the input clutch.

* * * * *